Sept. 28, 1926.  
J. SCHERMULY ET AL  
GROUND LEVELING DEVICE  
Filed Jan. 2, 1924  
1,601,542
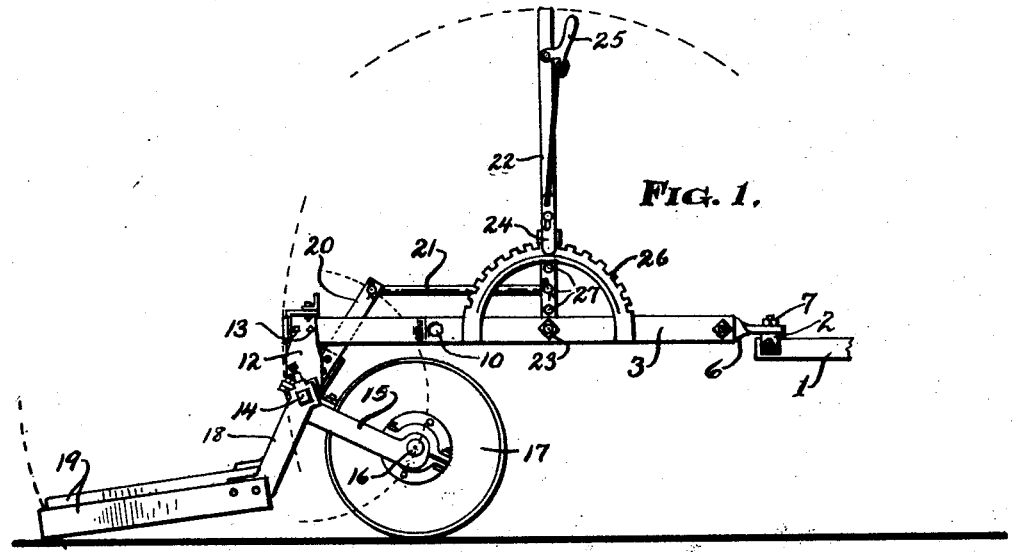
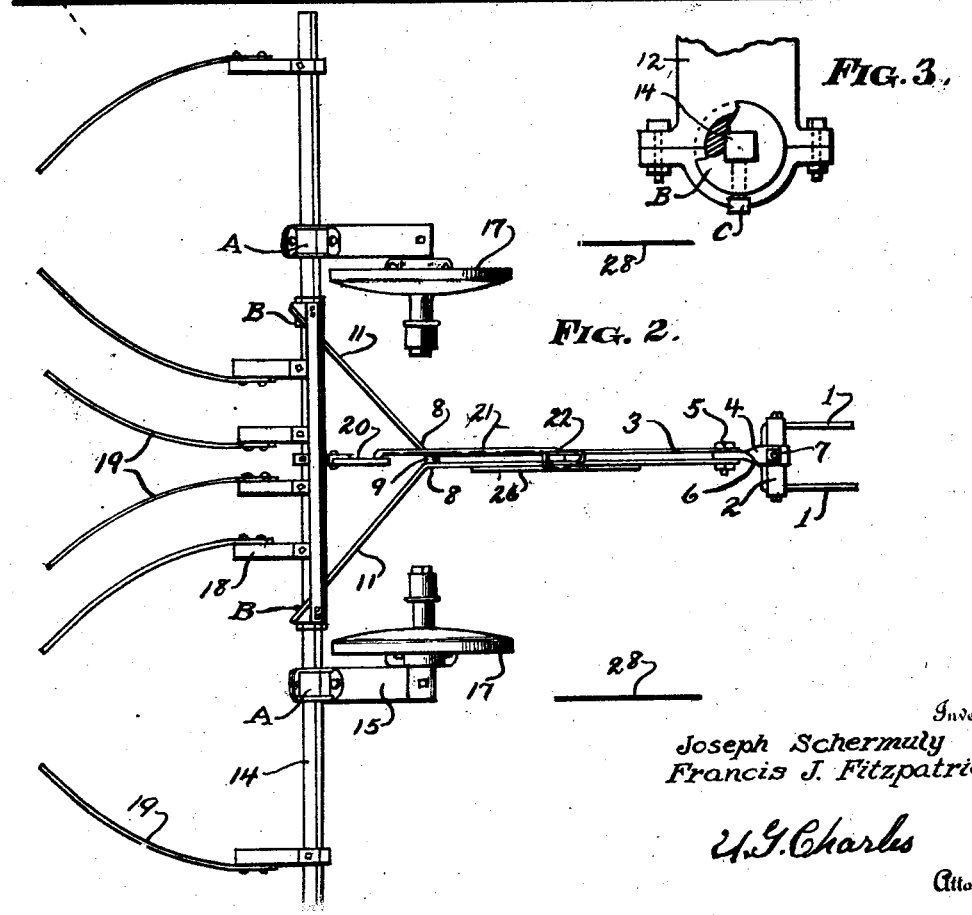
Inventors  
Joseph Schermuly  
Francis J. Fitzpatrick
U.G.Charles  
Attorney Patented Sept. 28, 1926.

1,601,542

UNITED STATES PATENT OFFICE.

JOSEPH SCHERMULY AND FRANCIS J. FITZPATRICK, OF WICHITA, KANSAS.

GROUND-LEVELING DEVICE.

Application filed January 2, 1924. Serial No. 683,967.

Our invention relates to a leveling device, to be attached to a ridge buster.

The object of our invention is to provide an adjustable leveling device, that will replace the earth when it is plowed by means of a lister or other furrowing device.

A further object of our invention is to provide a leveling device that follows immediately after the plow while the dirt is moist and soft.

Another object of our invention is to provide a leveling device that is adjustable and will accommodate for the depth that the plow is working.

Referring to the drawings, Fig. 1 is a side elevation of the device. Fig. 2 is a top view of the machine. Fig. 3 is an enlarged detail view of the beam bearing on the square shaft.

In the drawings referred to, the plow and its component parts are not shown, 1 is a frame attached to the plow frame, and to said frame is pivotedly attached a yoke 2, and to said yoke is pivotedly attached a beam 3, said beam being composed of two members, and between said members is a member 4 which is bolted firmly between said beam members at 5 and the said member 4 being twisted as at 6, so that the end thereof will lay flat, engaging with the yoke 2 at 7, and the said connection at 7 will be as a pivot connection forming a joint that will allow the mechanism to turn horizontally. The opposite ends of said beams being bent at 8, and firmly fastened together by a spreader 9 and bolt 10, and the angled portions 11 intersecting with an upright member 12, to which they are firmly attached, by means of bolts 13, and the said upright 12 having its bearing on a square shaft 14. The said member 12 is revolvably mounted on a collar B, the said collar being firmly attached to said shaft 14, by means of a set screw C. Arm 15 is rigidly attached to said shaft by means of clamps A, for spacing adustment as hereinafter described, and on the opposite end of said arm is revolvably mounted at 16, a wheel 17, said wheel functioning as carrying means for the blades and other parts of the mechanism. 18 is a plurality of arms which are rigidly attached to shaft 14, and on the opposite end of said arms is firmly attached, blades 19, which are curved, functioning as leveling means for the earth. 20 is a bar firmly attached to the shaft 14, for rotating purpose, in the direction shown by dotted lines and to the opposite end of said shaft is pivotedly mounted a rod 21, and the said rod is pivotedly connected to an adusting lever 22, said lever being pivotedly connected to the beam 3 at 23, and the said lever having a pawl 24 operated by hand fulcrum 25, and the said pawl is adapted to engage in the notches of a notched sector 26. Lever 22 contains a plurality of holes 27 for varying the throw of the shaft 14, by which means the blades may be adjusted to accommodate for the height of the ridge which is being leveled.

When the machine is in operation, the plows center on lines 28, and should they vary in width, the wheels on shaft 14 and also the blades may be adjusted to accommodate for the variation, and the position of said plows will form a ridge, throwing the dirt both ways, having the principal ridge under the beam 3 and immediately the ridge is leveled, throwing the dirt towards the furrows by the blades 19 which are centrally located and the blade on the extreme ends will throw the dirt, filling the furrow formed by the plows.

Such modifications may be made as lies within the scope of the appended claim, and what we claim as new and desire to secure by Letters Patent is—

In a ground leveling device, a square shaft carrying a plurality of ground leveling elements, a pair of wheels having arms as carrying elements for the shaft, a bifurcated beam having laterally extending members to connect with the shaft, collars rotatably mounted in the ends of the members, a square opening through the collars to engage on the square shaft and rigidly attached thereto so that said shaft will rotate freely in the ends of the members, a sector gear and an apertured leveler attached to the beam, a bar rigidly attached to the shaft, a connecting rod attached to the outwardly extending end of the bar, the opposite end engaging with a selected aperture of the leveler as hoisting means for the blades, the wheels functioning as the fulcrum, all as and for the purpose described.

JOSEPH SCHERMULY.
FRANCIS J. FITZPATRICK.